US007251284B2

(12) United States Patent
Menkhoff et al.

(10) Patent No.: US 7,251,284 B2
(45) Date of Patent: Jul. 31, 2007

(54) QAM RECEIVER

(75) Inventors: Andreas Menkhoff, Oberhaching (DE); Ruth Maijer, Munich (DE)

(73) Assignee: Infineon Technologies AG, Munich (DE)

( * ) Notice: Subject to any disclaimer, the term of this patent is extended or adjusted under 35 U.S.C. 154(b) by 602 days.

(21) Appl. No.: 10/303,254

(22) Filed: Nov. 25, 2002

(65) Prior Publication Data

US 2003/0123561 A1 Jul. 3, 2003

(30) Foreign Application Priority Data

Nov. 26, 2001 (DE) ................ 101 57 864

(51) Int. Cl.
*H04L 5/12* (2006.01)
*H04B 12/02* (2006.01)
*G01R 31/08* (2006.01)
*G01R 27/02* (2006.01)

(52) U.S. Cl. .............. 375/261; 375/213; 324/523; 324/603; 324/604; 324/605; 324/606

(58) Field of Classification Search ............ 455/313, 455/315, 317, 318, 323–24, 325, 334, 337–341, 455/255–265, 307–312, 226.1; 375/298, 375/295, 349, 316, 224, 261, 213; 324/526, 324/612, 603–606
See application file for complete search history.

(56) References Cited

U.S. PATENT DOCUMENTS 5,281,931 A 1/1994 Bailey et al.
5,612,975 A * 3/1997 Becker et al. ............ 375/319
5,881,376 A 3/1999 Lundberg et al.
6,009,317 A 12/1999 Wynn
6,714,605 B2 * 3/2004 Sugar et al. ............. 375/340

(Continued)

FOREIGN PATENT DOCUMENTS

DE 694 00 162 T2 12/1996

(Continued)

OTHER PUBLICATIONS

Cho et al., "A Frequency-Agile Single-Chip QAM Modulator with Beamforming Diversity," IEEE Journal of Solid-State Circuits (USA), vol. 36 ( No. 3), p. 398-407, ( Mar. 2001).

*Primary Examiner*—Mohammed Ghayour
*Assistant Examiner*—Sophia Vlahos
(74) *Attorney, Agent, or Firm*—Jenkins, Wilson, Taylor & Hunt, P.A.

(57) ABSTRACT

A QAM receiver is disclosed. According to one aspect, a QAM receiver includes a signal input for receiving an analog input signal. Further, the QAM receiver includes an anti-aliasing filter and a series connected analog/digital converter for converting the received analog input signal into a digital signal. A carrier freguency loon detects a carrier freguency of the received analog input signal. A clock phase loon detects a clock phase of the received analog input signal. A control circuit is switchable between a receive mode of operation and a test mode of operation. In the test mode, the control circuit applies a center freauency adiusting signal to the carrier freauency loon for adiustment of a center frequency and applies a freguency band adjusting signal to the clock phase loon for adiustment of a freguency bandwidth to measure power level values for the entire freauency band of the received analog input signal.

16 Claims, 8 Drawing Sheets

U.S. PATENT DOCUMENTS 6,928,581 B1* 8/2005 Tretter et al. ................... 714/8
2002/0191685 A1* 12/2002 Sadowski ................... 375/224

FOREIGN PATENT DOCUMENTS

| DE | 197 41 181 A1 | 3/1999 |
| DE | 693 22 330 T2 | 4/1999 |
| DE | 694 20 727 T2 | 1/2000 |
| DE | 199 26 101 A1 | 2/2001 |
| EP | 0 473 373 A2 | 3/1992 |
| WO | WO 01/28310 A2 | 4/2001 |

* cited by examiner

QAM RECEIVER

TECHNICAL FIELD

The invention relates to a QAM receiver with an integrated measuring circuit for measuring the power density of a received signal.

BACKGROUND ART

FIG. 1 shows a QAM receiver according to the prior art.

As shown in FIG. 1, the QAM receiver receives an analog signal from a transmitter S. The data signal coming from a data source is transmitted by the transmitter S to a tuner T via a transmission channel. The tuner T precedes the actual QAM receiver IC and is used for tuning to the received signal. The received signal is delivered by the tuner T via an anti-aliasing filter AAF to at least one analog/digital converter ADC. The ADC output signal is supplied to a mixing stage. The in-phase signal component I and the quadrature component Q are present at the output of the mixing stage. The in-phase signal I and the quadrature phase signal Q are multiplied by a control signal in the time domain. The output signals of the mixing stage are supplied to digital resampling filters. The resampling filters perform a resampling of the received signal which, at the same time, is subjected to band limiting. During this process, the resampling filters receive a control signal from a numerically controlled oscillator NCO within a clock phase loop. The control signal sets the time of the sampling in dependence on a filtered clock phase error signal TP.

At the output end, the resampling filters RES are connected to an automatic gain control AGC. The automatic gain control AGC is followed by so-called matched filters MF. During transmission via the real transmission channel, the received signal, as a rule, exhibits linear distortion and an additional noise component. The QAM receiver has the task of reconstructing the bit sequence of the data source from the received signal. The matched filters (MF) are digital receive filters which are matched to a transmit filter in the transmitter S, in such a manner that the amplitude of the received signal is maximum at the sampling times. The matched filter MF can be adaptively constructed so that it can be adapted to the transmission channel. Before or after the matched filters (MF), an adaptive equalizer can be additionally provided which compensates for the distortion of the transmission channel.

The output signal of the matched filters (MF) is fed back to the automatic gain control AGC in a feedback loop. In addition, the output signals of the two matched filters MF are supplied to a clock phase detector TPD and a carrier frequency detector TFD. The clock phase detector TPD generates from the two output signals a clock phase error detection signal TP which is supplied to a downstream digital filter B. The clock phase error detection signal TP specifies the deviation of the clock phase of the received signal from a nominal value.

The filtered clock phase error detection signal TP is supplied to the numerically controlled oscillator NCOB which generates a control signal for setting the sampling times of the resampling filters RES.

The carrier frequency detector TFD forms from the output signals of the two matched filters MF a carrier frequency error detection signal TF which is supplied to a digital filter A. The filtered carrier frequency error detection signal TF is supplied to a numerically controlled oscillator NCOA which generates a control signal for the mixing stage.

The mixing stage forms a carrier frequency loop with the resampling filters RES, the gain control AGC, the matched filters MF, the carrier frequency detector TFD, the filter A and the numerically controlled oscillator NCOA.

The resampling filters RES form a clock phase loop with the automatic gain control AGC, the two matched filters MF, the clock phase detector TPD, the filter B and the numerically controlled oscillator NCOB.

The QAM receiver of the prior art, shown in FIG. 1, is thus constructed with two stages. The carrier frequency loop effects control in a first carrier frequency capture range until the carrier frequency error detection signal TF exhibits the error value zero at a nominal carrier frequency. In the second stage, the clock phase loop effects control until the clock phase error detection signal TP also exhibits the value zero within a clock phase capture range. This is indicated to the QAM receiver by means of a carrier phase and clock phase lock detection circuit (not shown).

After the QAM receiver IC and its interconnection with the tuner have been produced, both the QAM receiver IC, the tuner and the interconnection of the QAM receiver IC produced are tested. In particular, it is tested whether the tuner T, the anti-aliasing filter AAF and the downstream analog/digital converter ADC are operating correctly. In a measuring circuit of the prior art, this is done with the aid of an external spectrum analyzer for measuring the power density of a frequency spectrum applied.

FIG. 2 shows a measuring arrangement for measuring the tuner of the prior art. A known transmit signal is fed into an input node E preceding the tuner and the signal output by the tuner is applied to the spectrum analyzer at a tapping node A. The spectrum analyzer measures the frequency response of the tuner in order to determine whether it is operating correctly.

FIG. 3 shows a further measuring arrangement of the prior art for measuring the anti-aliasing filter AAF contained in the receiver IC. The AAF filter can be integrated in the receiver IC or precede the latter. In the measuring arrangement shown in FIG. 3, the tapping point A is located within the QAM receiver IC produced so that the tapping after the anti-aliasing filter AAF can only be managed with a very large amount of effort.

FIG. 4 shows a further measuring arrangement for measuring the analog/digital converter within the QAM receiver IC. In the measuring arrangement shown in FIG. 4, both the feed point E and the tapping point A are located inside the receiver IC so that both the signal injection and the signal extraction can only be managed with a very large amount of effort.

The measuring arrangements of the prior art as shown in FIGS. 2 to 4 need an external spectrum analyzer for measuring the components contained in the QAM receiver. Such a spectrum analyzer is very expensive and, moreover, not always available. The configuration of the measuring arrangements shown in FIGS. 2 to 4 is often very elaborate, particularly since the signal feed points E and the tapping points A are partly inside the QAM receiver IC. The signal injection and the signal extraction are additionally made more difficult because of the high signal frequencies.

SUMMARY OF THE INVENTION

It is, therefore, the object of the present invention to create a QAM receiver in which internal components can be tested for their operability without requiring an external spectrum analyzer.

In addition, the invention provides the advantage of measuring the spectrum of the input signal in order to detect the frequency range in which a signal component is present and the frequency range within which noise is present. This makes it possible to determine in a simple manner clock frequency and carrier frequency of the received signal.

According to the invention, this object is achieved by a QAM receiver with integrated measuring circuit for measuring the power density of a received signal.

The integrated measuring circuit makes it possible to measure the analog components of the QAM receiver.

The invention creates a QAM receiver with integrated measuring circuit for measuring the power density of a received signal.

In a preferred embodiment, the QAM receiver contains a carrier frequency loop for detecting the carrier frequency of the received signal and a clock phase loop for detecting the clock phase of the received signal.

The QAM receiver preferably exhibits an anti-aliasing filter AAF which follows a tuner for the received analog signal.

The anti-aliasing filter AAF is preferably followed by an analog/digital converter ADC which converts the received analog signal into a received digital signal.

The QAM receiver according to the invention preferably contains a mixing stage which multiplies the received digital signal by a control signal of the carrier frequency loop and delivers it to subsequent resampling filters.

The resampling filters preferably perform resampling and band limiting of the digital in-phase signal and of the digital quadrature phase signal in dependence on a control signal of the carrier phase loop.

In a preferred embodiment, the QAM receiver according to the invention contains an automatic gain control AGC which follows the resampling filter.

In a preferred embodiment, the QAM receiver according to the invention contains a matched filter MF for the digital in-phase signal and a matched filter MF for the digital quadrature phase signal.

The carrier frequency loop of the QAM receiver according to the invention preferably contains a carrier frequency detector which generates a carrier frequency error detection signal TF in dependence on the filtered output signals of the two matched filters MF, a subsequent digital loop filter and a numerically controlled oscillator for generating the control signal for the mixing stage.

The clock phase loop of the QAM receiver according to the invention preferably contains a clock phase detector which generates a clock phase error detection signal TP in dependence on the filtered output signals of the two matched filters, a subsequent digital loop filter and a numerically controlled oscillator for generating a control signal for the resampling filters.

In a particularly preferred embodiment of the QAM receiver according to the invention, a multiplexer is in each case provided between the digital loop filter and the numerically controlled oscillator in the carrier frequency loop and in the clock phase loop.

The two multiplexers in each case preferably exhibit a first input for the signal filtered by the digital loop filter, a second input for an adjusting signal, an output for connection to the numerically controlled oscillator NCO and a control input for switching between the two inputs.

In a preferred embodiment, the QAM receiver according to the invention contains an integrated control circuit which switches the first input of the multiplexers through to the numerically controlled oscillator NCO in a normal receive mode of operation and switches the second input of the multiplexers through to the numerically controlled oscillator NCO in a measuring mode of operation.

In the measuring mode of operation, the control circuit preferably applies a center frequency adjusting signal MFES to the second input of the multiplexer of the carrier frequency loop and a frequency bandwidth adjusting signal FBES to the second input of the multiplexer of the clock phase loop.

The control circuit preferably additionally drives the automatic gain control AGC via a control line for reading out the power level values.

The integrated control circuit preferably receives an external control signal for switching between the receive mode of operation and the measuring mode of operation via a control line.

The anti-aliasing filter AAF is preferably followed by a multiplexer which is switched by the control circuit via a further control line.

The multiplexer following the anti-aliasing filter AAF contains a first input which is connected to the output of the anti-aliasing filter AAF, a second input which is connected to the input of the anti-aliasing filter AAF and an output which is connected to the analog/digital converter ADC.

BRIEF DESCRIPTION OF THE DRAWINGS

In the further text, preferred embodiments of the QAM receiver according to the invention are described with reference to the attached figures for explaining features essential to the invention. In the figures.

DETAILED DESCRIPTION OF THE INVENTION

Figure 1:
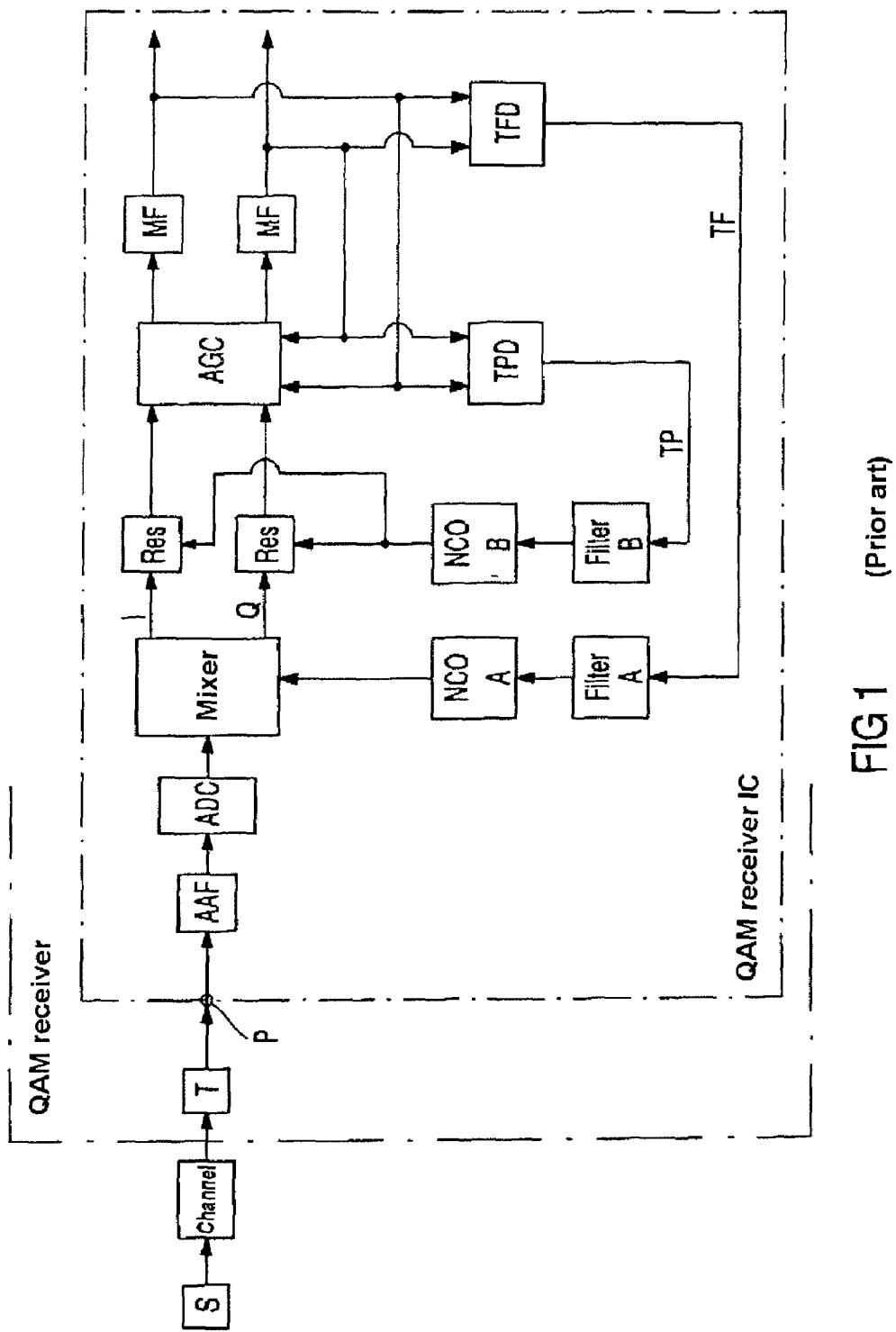
FIG. 1 shows a QAM receiver of the prior art.
Figure 2:
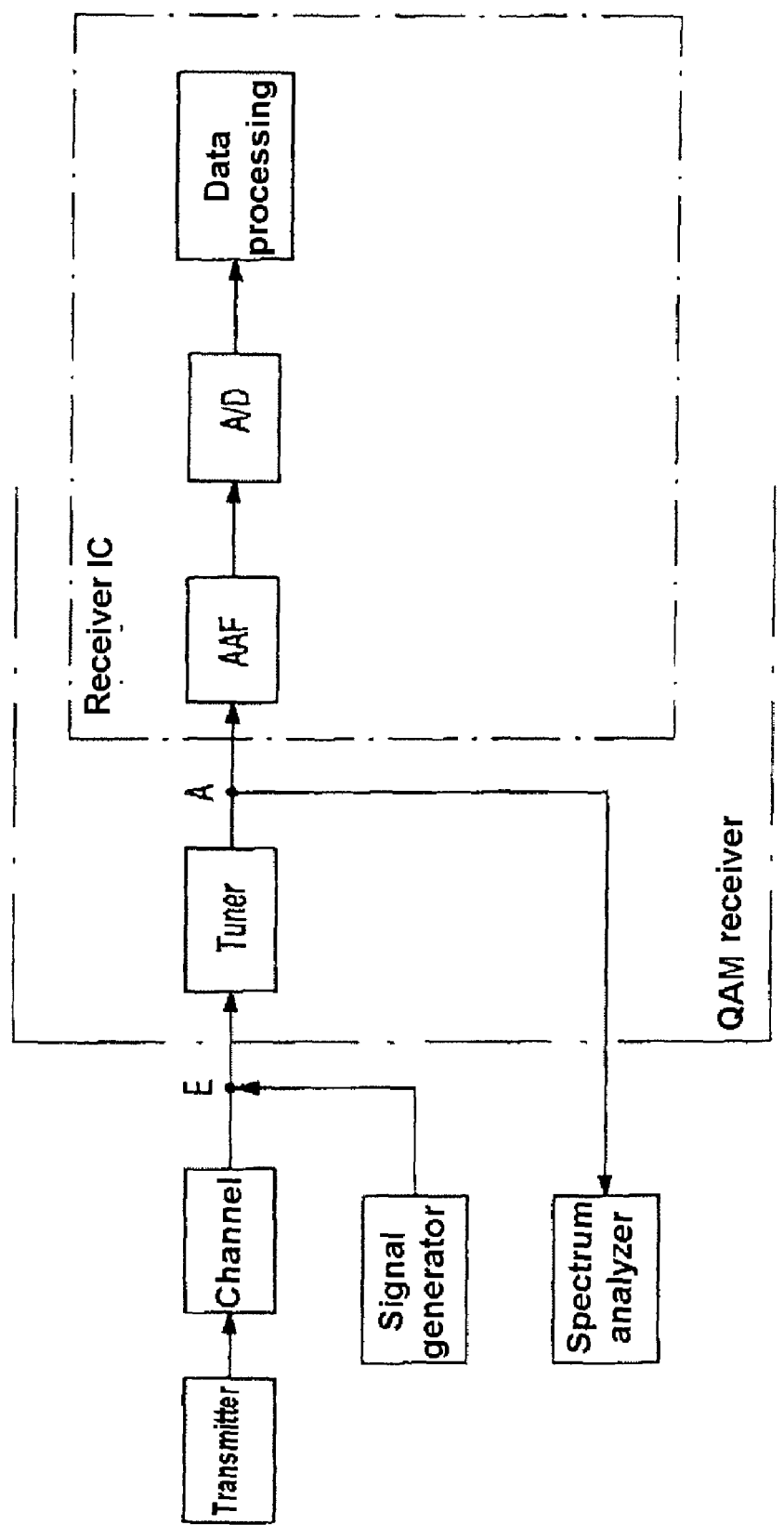
FIG. 2 shows a first measuring arrangement for measuring a tuner T within a QAM receiver of the prior art.
Figure 3:
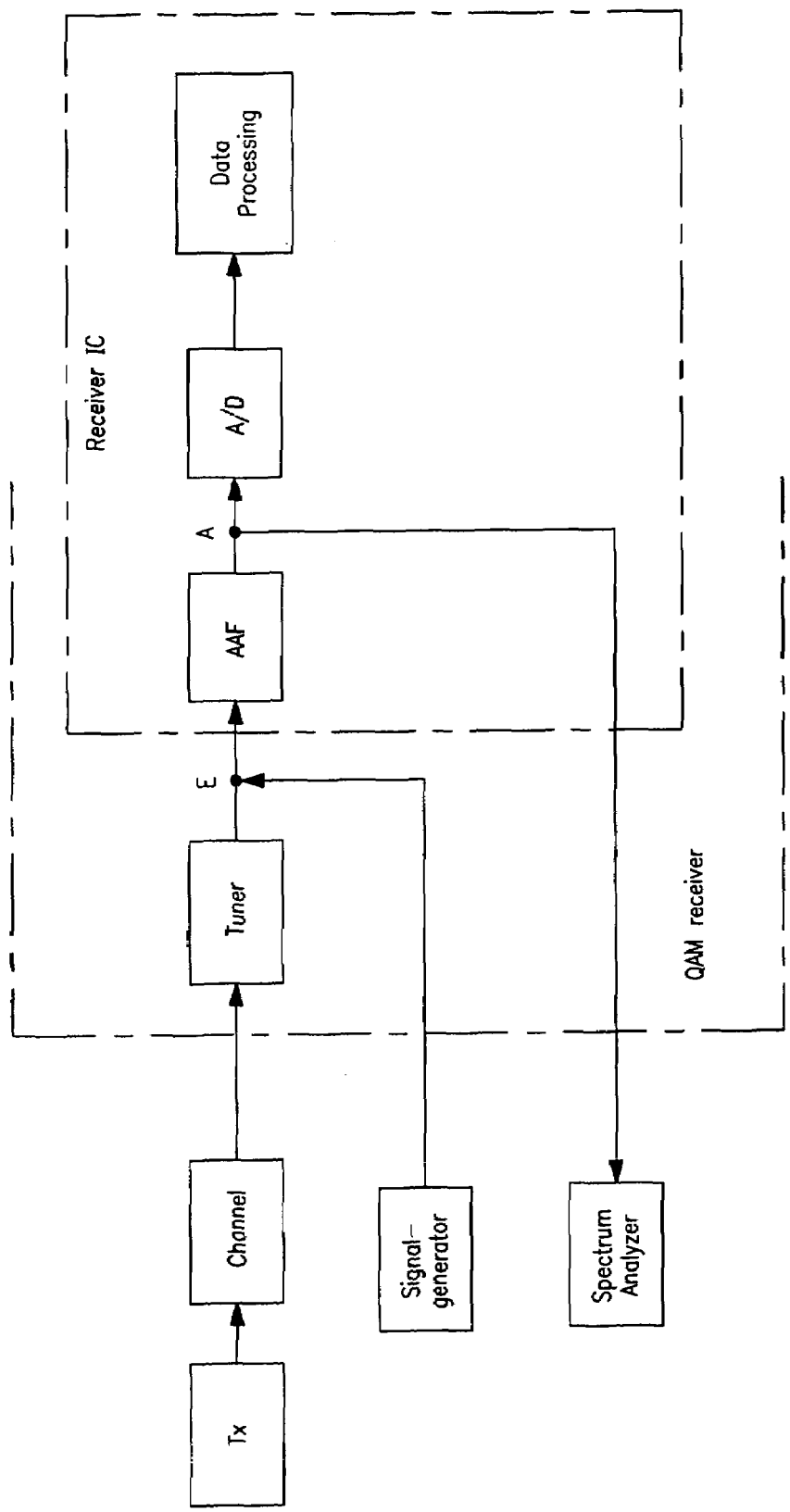
FIG. 3 shows a second measuring arrangement for measuring an anti-aliasing filter AAF within a QAM receiver of the prior art.
Figure 4:
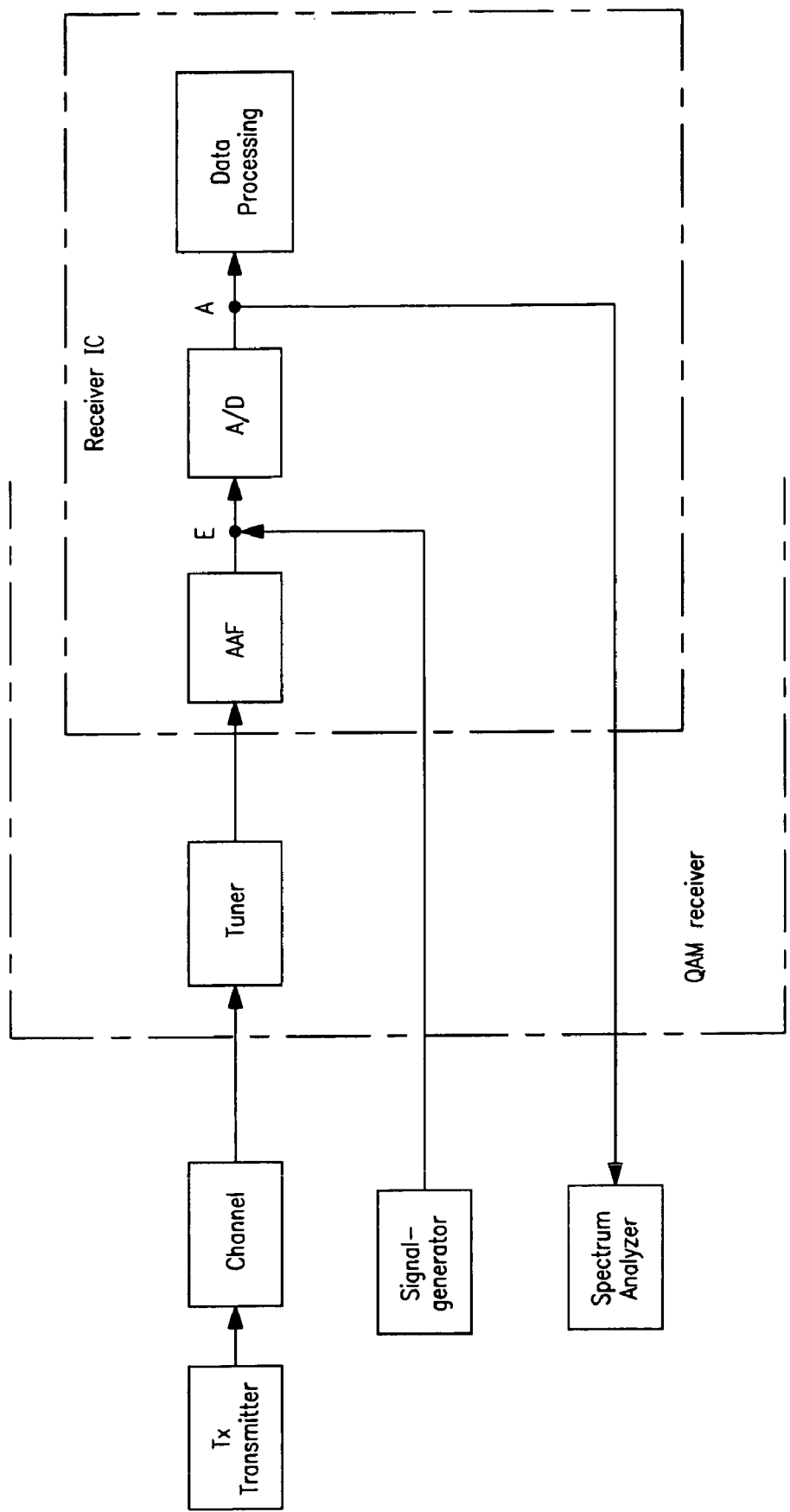
FIG. 4 shows a third measuring arrangement for measuring an analog/digital converter within a QAM receiver of the prior art.
Figure 5:
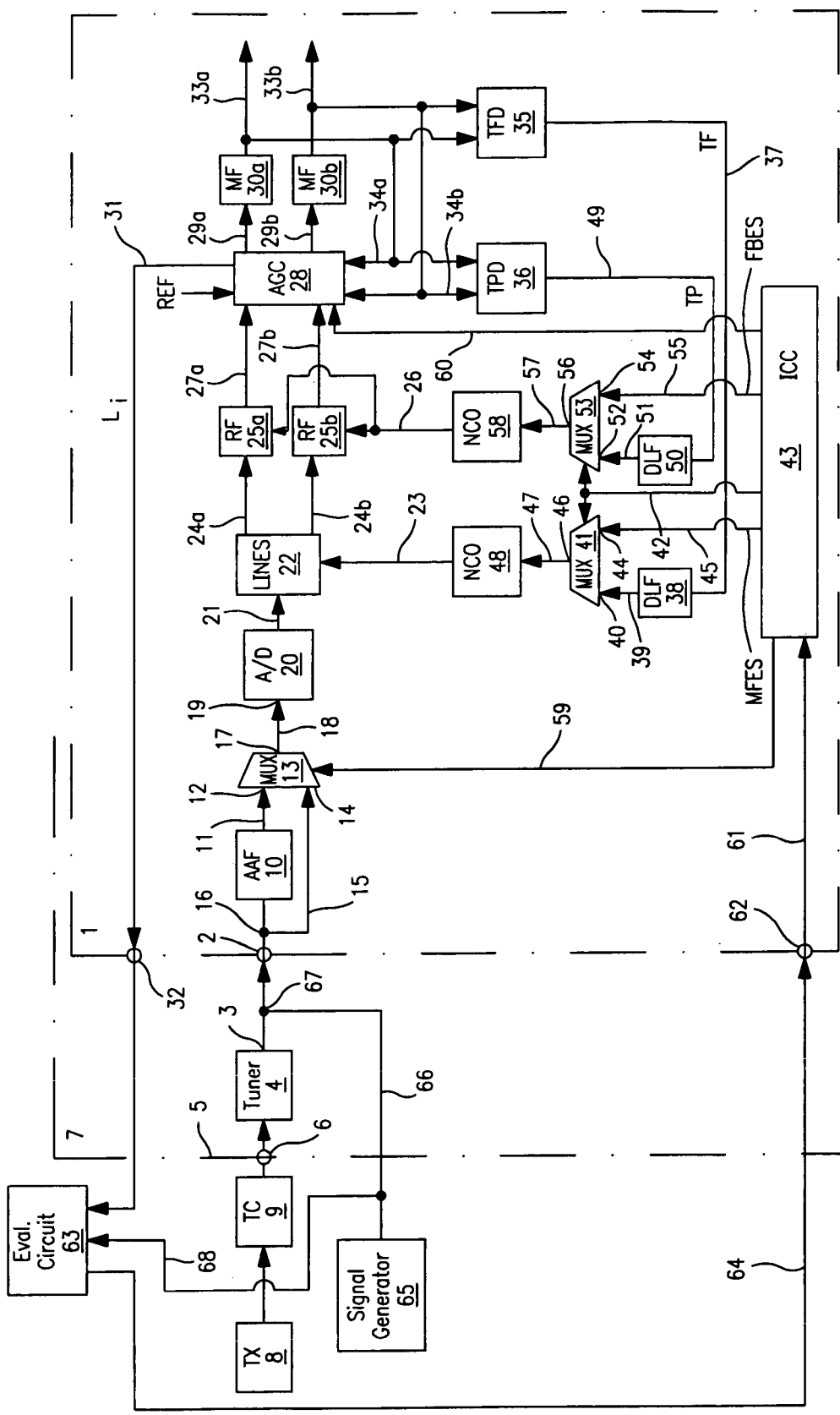
FIG. 5 shows a measuring arrangement for a QAM receiver according to the invention.

FIG. 5 shows a QAM receiver IC 1 according to the invention with a signal input 2 which is preceded by a tuner 4 via a line 3. The input of the tuner 4 is connected to a signal input 6 of a QAM receiver 7 via a line 5. The QAM receiver IC 1 and the tuner 4 form the essential components of the QAM receiver 7. The QAM receiver 7 receives an analog received signal from a transmitter 8 via a transmission channel 9. The tuner 4 is tuned to the receive frequency of the received signal.

In the further text, the internal configuration of the QAM receiver IC 1 is explained in detail. The signal input 2 of the QAM receiver IC 1 is followed by an anti-aliasing filter 10. The output of the anti-aliasing filter 10 is connected via a line 11 to a first input 12 of a multiplexer 13. The multiplexer 13 has another input 14 which is connected to a branching node 16 before the anti-aliasing filter 10 via a line 15. The multiplexer 13 exhibits a signal output 17 which is connected to a signal input 19 of the subsequent analog/digital converter 20 via a line 18. The analog/digital converter 20 converts the filtered analog input signal into a digital input signal. The digital input signal is supplied to a subsequent mixing stage 22 via a line 21. The mixing stage 22 multiplies the digital input signal in the time domain by a control signal which is applied via a line 23 and delivers the output signals generated as in-phase signal component and quadrature phase component via lines 24a, 24b to subsequent resampling filters 25a, 25b. The resampling filters 25a, 25b resample the digital in-phase signal and the digital quadrature phase signal in dependence on a control signal which is applied via a line 26. The resampling filters 25a, 25b are connected to a subsequent gain control circuit 28 via lines 27a, 27b. The gain control circuit 28 performs an automatic gain control and delivers controlled output signals via lines 29a, 29b to a matched filter 30a for the digital in-phase signal component and a matched filter 30b for the digital quadrature phase signal component. The automatic gain control 28 also exhibits a read line 31 which is connected to a read terminal 32 of the QAM receiver IC 1. The read line 31 is used for reading power level values L. The output signals of the matched filters 30a, 30b are conducted via lines 33a, 33b to a subsequent data processing circuit for further evaluation. The output signals of the two matched filters 30a, 30b are additionally fed back to the automatic gain control 28 via feedback lines 34a, 34b. In addition, the output signals of the two matched filters 30a, 30b are applied to a carrier frequency detector 35 and to a clock phase detector 36. The output of the carrier frequency detector 35 is connected to a digital loop filter 38 via a line 37. The carrier frequency detector 35 forms a carrier frequency error detection signal TF, which is filtered by the digital loop filter 38, in dependence on the filtered in-phase signal and the filtered quadrature phase signal. The output of the digital loop filter 38 is connected to an input 40 of a multiplexer 41 via a line 39. The multiplexer 41 is switched between the input 40 and a further input 44 by an integrated control circuit 43 via a control line 42. The second input 44 of the multiplexer 41 is also connected to the integrated control circuit 43 via an adjusting line 45. The multiplexer 41 exhibits a signal output 46 which is connected to a numerically controlled oscillator circuit 48 via a line 47. The numerically controlled oscillator circuit 48 forms a control signal for the mixing stage 22 in dependence on the filtered carrier frequency error detection signal TF which is switched through by the multiplexer 41, in a normal receive mode of operation. The mixing stage 22 forms a carrier frequency loop with the resampling filters 25, the automatic gain control 28, the matched filters 30, the carrier frequency detector 35, the digital loop filter 38 and the numerically controlled oscillator 48.

The clock phase detector 36 also receives the output signals from the matched filters 30a, 30b and forms a clock phase error detection signal TP in dependence on the in-phase signal applied and on the quadrature phase signal applied. The clock phase detector 36 is connected to a digital loop filter 50 via a line 49. The digital loop filter 50 filters the clock phase error detection signal TP applied and delivers it to an input 52 of a further multiplexer 53 via a line 51. The multiplexer 53 is also switched by the control line 42 from the integrated control circuit 43. The multiplexer 53 exhibits, in addition to the input 52, a further input 54 which is connected to the integrated control circuit 43 via a line 55. In addition, the multiplexer 53 exhibits an output 56 which is connected to a subsequent numerically controlled oscillator 58 via a line 57. The numerically controlled oscillator 58 forms the control signal for adjusting the resampling filters 25a, 25b.

The integrated control circuit 43 switches the multiplexer 13 via a control line 59 and controls the automatic gain control 20 via a control line 60. The integrated control circuit 43 can be switched between two modes of operation. For this purpose, the integrated control circuit 43 receives a switching signal via a line 61 via a signal input 62 of the integrated QAM receiver IC 1 from an external evaluating circuit 63 via an external switching line 64.

In a normal receive mode of operation, the carrier frequency loop and the clock phase loop are closed, i.e. the control circuit 43 controls the two multiplexers 41, 53 via the control line 42, in such a manner that the input 40 of the multiplexer 41 is switched through to the subsequent numerically controlled oscillator 43 and the input 52 of the multiplexer 53 is switched through to the subsequent numerically controlled oscillator 58.

If the integrated control circuit 43 is switched from the normal mode of operation into a test mode of operation via the external line 64, it switches the two multiplexers 41, 53 to the other signal input 44 and 54, respectively. After the multiplexer is switched over, the control circuit 43 applies a center frequency adjusting signal MFES to the signal input 44 of the multiplexer 41 of the carrier frequency loop via the line 55. The center frequency adjusting signal MFES for the numerically controlled oscillator 48 generates the control signal to the mixing stage 22 and adjusts the center frequency of the part-spectrum of the signal covered.

After the switch-over, the integrated control circuit 43 also applies a frequency bandwidth adjusting signal FBES to the second input 54 of the multiplexer 53 of the clock phase loop via the adjusting line 55. The adjusting signal adjusts the frequency bandwidth $\Delta f$ of the resampling filters 25a, 25b via the numerically controlled oscillator 58 and the control line 26. After the adjustment of the center frequency $f_{center}$ in the mixing stage 22 and of the frequency bandwidth $\Delta f_i$, the energy in the frequency band $\Delta f_i$ measured is determined and read out as power level value $L_i$ for the ith frequency band considered in the received signal from the automatic gain control 28 via the read line 31 by the external evaluating circuit 63.

The integrated control circuit 43 first sets the frequency bandwidth $\Delta f$ via the frequency bandwidth adjusting signal FBES and then changes the center frequency $f_{center}$ by means of the center frequency adjusting signal MFES until the entire signal spectrum of the input signal located between a lower and an upper limit frequency $f_{LIMIT}$ is measured.

Figure 6:
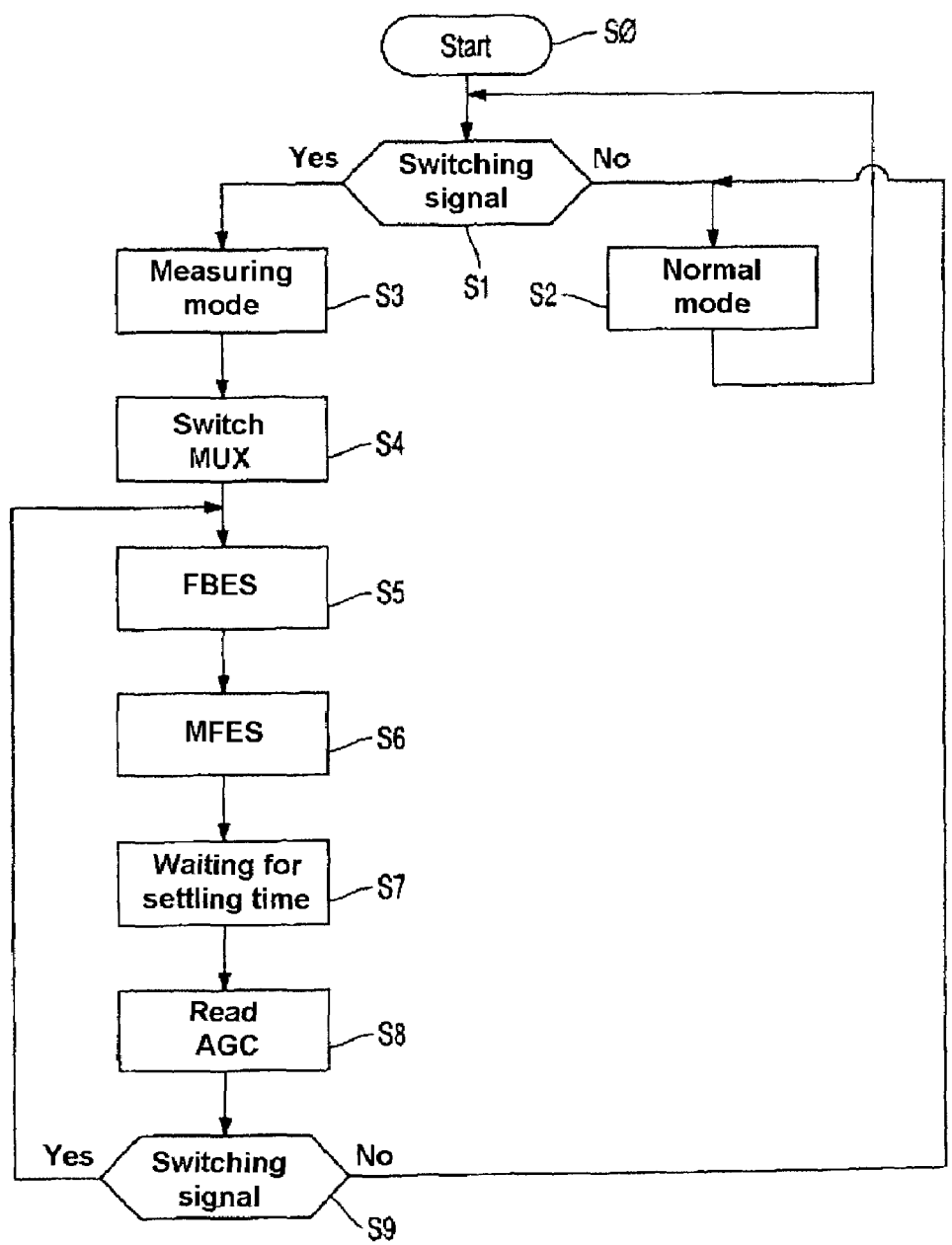
FIG. 6 shows a flowchart for explaining the operation of a measuring process in the QAM receiver according to the invention.

FIG. 6 shows a flowchart for explaining the operation of the mode of the QAM receiver according to the invention as shown in FIG. 5. After a start step S0, the integrated control circuit 43 checks in a step S1 whether a switching signal is present via the external control terminal 62. If no switching signal for switching to a measuring mode is present, the QAM receiver 7 goes into a normal receive mode in step S2. In the normal receive mode, the switching signal is interrogated at regular time intervals. If the integrated control circuit 43 detects in step S1 that a switching signal for switching to a measuring mode is present, the integrated control circuit 43 switches the QAM receiver 7 to a test mode of operation in a step S3. Following that, the two multiplexers 41, 53 are switched to the second input 44 and 54, respectively, via the control line 42 from the integrated control circuit 43 in a step S4.

In a step S5, the integrated circuit 43 adjusts the frequency bandwidth Δf for measuring a spectrum via the frequency band adjusting signal FBES.

In a step S6, the center frequency $f_{CENTER}$ is then adjusted by the integrated control circuit 43 by means of the center frequency adjusting signal MFES.

The integrated control circuit 43 then waits in a step S7 for a predetermined period of time until the resampling filters 25a, 25b and the automatic gain control 28 have settled.

In a further step S8, the integrated control circuit 43 delivers a control signal to the automatic gain control 28 for reading out a power level value $L_i$ via the line 60. The power level value $L_i$ reproduces the energy in the part-frequency band Δf set. The power level values L1, L2, L3 ... $L_N$ for the entire frequency band of the received signal considered are successively measured and temporarily stored in the evaluating circuit 63 and then evaluated.

In a step S9, the integrated control circuit 43 checks whether there is to be a switch-over back into a normal mode of operation or not. If the switching signal still specifies a measuring mode, the process returns to step S5 and the integrated control circuit 43 adjusts the center frequency $f_{center}$ of the next part-frequency band $Δf_i$ to be measured within ΔF of the entire frequency band in step S6. The operating sequence shown in FIG. 6 makes it possible to measure the power density spectrum of an unknown received signal with a known frequency response of the analog components, i.e. of the tuner of the anti-aliasing filter 10 and of the analog/digital converter 20. The measuring mode of operation and the normal mode of operation can be switched alternatingly in time-division multiplex.

In addition, the measuring circuit integrated in the QAM receiver 7 provides the possibility of measuring the hitherto unknown frequency response of the analog components, i.e. of the tuner of the analog anti-aliasing filter 10 and of the analog/digital converter 20, by means of a known input signal in order to determine their operability.

For this purpose, a known input signal is fed in at a feed point 67 via the line 66 by means of a signal generator 65 and supplied to the signal input 2 of the QAM receiver IC 1. The integrated control circuit 43 initially switches the multiplexer 13 via the control line 59 in such a manner that the signal output of the anti-aliasing filter 10 is present at the signal input 19 of the analog/digital converter 20. Thus, the anti-aliasing filter 10 and the analog/digital converter 20 are initially connected in series.

As shown in the sequence shown in FIG. 6, the measured power level values $L_i$ of the entire frequency band ΔF to be measured between the two limit frequencies $f_{LIMIT}$ are read out of the automatic gain control 28 via the line 31 by the evaluating circuit 63 and from these an output signal is calculated. The evaluating circuit 63 compares the known output signal of the signal generator 65, present on the line 68, with the output signal calculated from the power level values $L_i$. If the calculated output signal and the generated input signal are largely identical, the conclusion can be drawn that the anti-aliasing filter 10 and the series-connected analog/digital converter 20 are operating faultlessly. If, conversely, it is found that the input signal generated and the output signal of the QAM receiver chip 1, calculated from the power level values, are not identical, either the anti-aliasing filter 10 or the downstream analog/digital converter 20 is faulty.

In order to find out which of the two analog components is malfunctioning, the multiplexer 13 is switched from the input 12 to the input 14 by the integrated control circuit 43 in a further measuring step so that the anti-aliasing filter 10 is bypassed. The known input signal generated by the signal generator 65 is applied directly to the analog/digital converter 20, bypassing the anti-aliasing filter 10. Following this, the power level values $L_i$ are again read out by the evaluating circuit 63 and from these a signal is reconstructed. The evaluating circuit 63 compares the injected signal generated by the signal generator 65 with the reconstructed output signal. If the two signals are largely identical, the conclusion can be drawn that the analog/digital converter 20 is operating faultlessly and thus a maladjustment of the anti-aliasing filter 10 exists. If the injected signal and the reconstructed output signal differ even in this second measuring step, it can be found that both the anti-aliasing filter and the analog/digital converter 20 are faulty.

Figure 7:
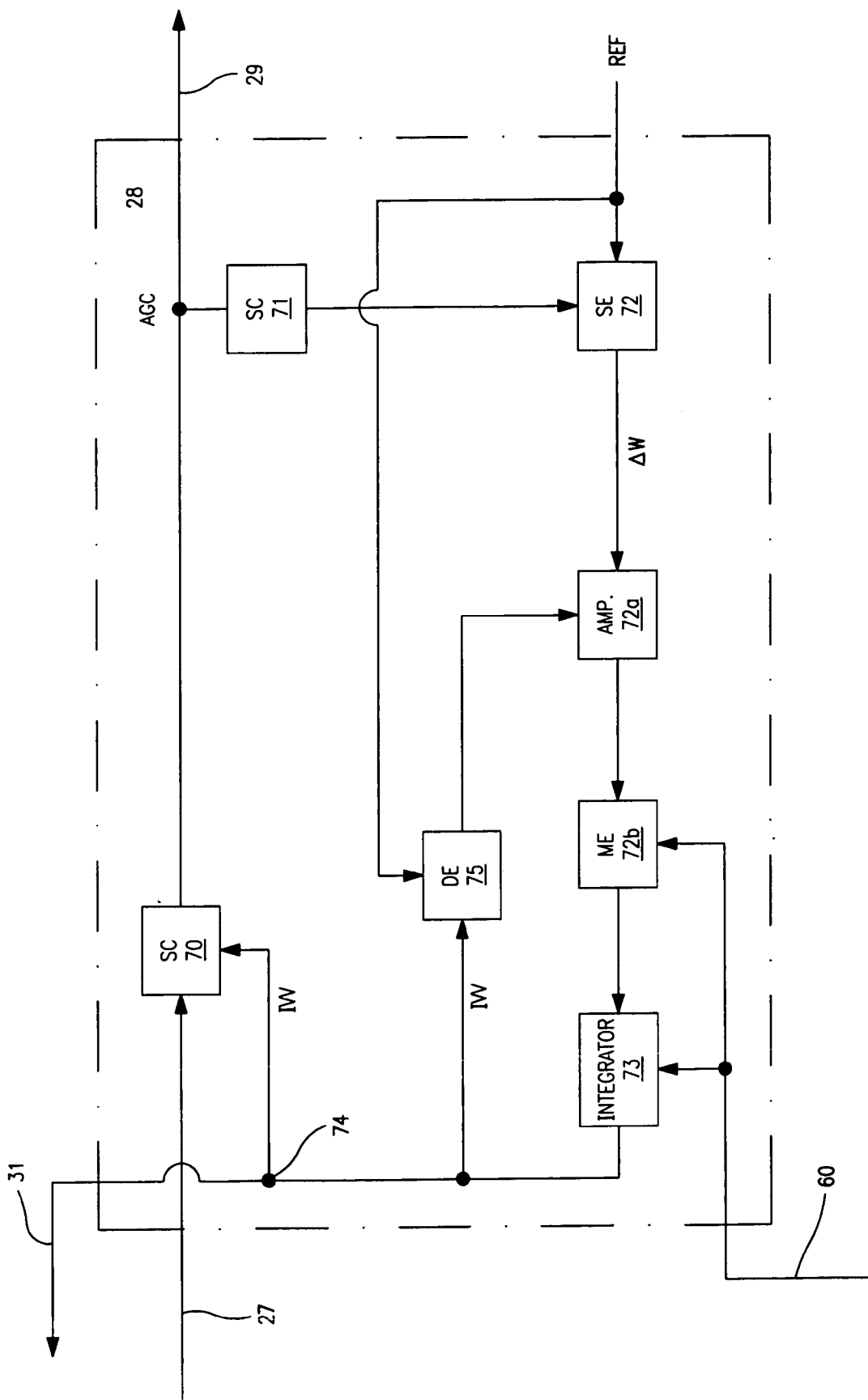
FIG. 7 shows a block diagram of the automatic gain control contained in the QAM receiver according to the invention.

FIG. 7 shows a preferred embodiment of the automatic gain control 28 within the QAM receiver 7 according to the invention. The automatic gain control 28 contains a multiplication element 70 which multiplies the input signal by an integrator value IW to form an output signal. The output signal is adapted in a signal converter 71 in such a manner that it can be compared with a reference value REF. For this purpose, the automatic gain control 28 contains a differentiating element 72 by means of which the adapted output signal is subtracted from the reference value. The differentiating element 72 provides a difference value DW which is delivered to a multiplication element 72a. The multiplication element 72a is followed by an adjustable amplifier 72b. The gain factor k of the amplifier 72b is adjusted by the control circuit 43 via the control line 60. The integrator value IW is fed back via a division element 75 for multiplication by the difference value DW.

At the beginning of the measurement, the control circuit 43 adjusts the integrating element 73 to a predetermined starting value. The gain factor k of the amplifier 72b is initially set to a high gain value by the control circuit 43 via the control line 60. As a result, the gain control loop 28 is fast and relatively inaccurate at the beginning of the measurement. In the course of the measurement, the gain factor k of the amplifier 72b is progressively reduced by the control circuit 43 so that control is slower and more accurate.

The signal delivered by the amplifier 72b is integrated by an integrating element 73. In the case of a positive signal, the integrator value IW is increased and in the case of a negative difference value $Δ_{IN}$, the integrator value IW is reduced. The output of the integrating element 73 is branched at a branching node 74 in order to be able to read out the power level values at the output of the integrating element 73.

Figure 8:
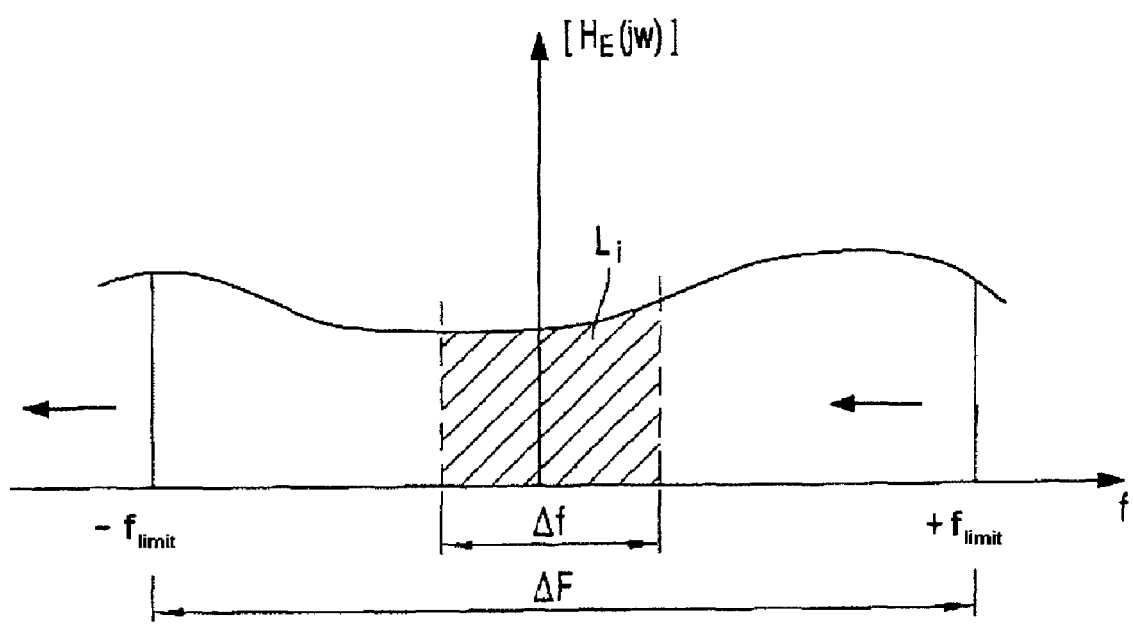
FIG. 8 shows a diagram for explaining the operation of the QAM receiver according to the invention.

FIG. 8 shows the spectrum of a received signal at the signal input 2 of the QAM receiver chip. In the measuring mode of operation, this signal spectrum can be measured with the measuring circuit, integrated in the QAM receiver, for measuring the power density of the received signal within the two limit frequencies $f_{LIMIT}$. For this purpose, the integrated control circuit 43 adjusts the frequency bandwidth $Δf_i$ of a part-frequency band within the entire spectrum ΔF by means of the frequency band adjusting signal FBES. Following this, the center frequency is changed at the mixing stage 22 by changing the center frequency adjusting signal MFES and the power spectrum of the received signal is pushed through a measuring window with the frequency bandwidth $Δf_i$. The automatic gain control 28 measures the average power level in the frequency band Δf and delivers a power level value $L_i$ to the evaluating circuit 63 via the line 31.

The evaluating circuit 63 stores the spectral power density values $L_i$ successively gained and obtains a power density spectrum of the received signal consisting of a number of spectral power density values $L_i$. From this power density spectrum, it is possible either to reconstruct the received signal or, when the received signals are known, to determine the frequency response of the analog components of the QAM receiver 7, i.e. of the anti-aliasing filter 10 or of the analog/digital converter 20. This makes it possible to determine maladjustments or faulty manufacturing of analog components within the QAM receiver 7.

Due to the integrated test circuit for measuring the power density of the received signal, an external measuring arrangement, particularly an external spectrum analyzer, can be dispensed with. Measuring the power density spectrum is, therefore, less susceptible to noise, on the one hand, and, on the other hand, can also be performed with simple test equipment. The integrated measuring circuit comprises the integrated control circuit 43 and the two multiplexers 41, 53 additionally installed. To measure the anti-aliasing filter 10 and the downstream analog/digital converter 20, the further multiplexer 13 is additionally provided optionally. In a preferred embodiment, the integrated control circuit 43 delivers interrupt signals to the evaluating circuit 63 by means of an interrupt line after each measurement of a power density value $L_i$ so that the evaluating circuit 63 recognizes that a single measurement is concluded.

LIST OF REFERENCE DESIGNATIONS

1 QAM receiver IC
2 Signal input
3 Line
4 Tuner
5 Line
6 Signal input
7 QAM receiver
8 Transmitter
9 Transmission channel
10 Anti-aliasing filter
11 Line
12 Input
13 Multiplexer
14 Input
15 Line
16 Branching node
17 Output
18 Line
19 Input
20 Analog/digital converter
21 Lines
22 Mixing stage
23 Control line
24 Lines
25 Resampling filter
26 Control line
27 Line
28 Automatic gain control
29 Lines
30 Matched filter
31 Read line
32 Read terminal
33 Lines
34 Lines
35 Carrier frequency detector
36 Carrier phase detector
37 Control line
38 Digital loop filter
39 Line
40 Input
41 Multiplexer
42 Control line
43 Integrated control circuit
44 Input
45 Adjusting line
46 Output
47 Line
48 Numerically controlled oscillator
49 Control line
50 Digital loop filter
51 Line
52 Input
53 Multiplexer
54 Input
55 Adjusting line
56 Output
57 Line
58 Numerically controlled oscillator
59 Control line
60 Control line
61 Switching line
62 Switching terminal
63 Evaluating circuit
64 External control line
65 Signal generator
66 Feeding line
67 Input node
68 Line
70 Multiplication element
71 Signal converter
72 Subtracting element
72a Multiplication element
72b Amplifier
73 Integrator
74 Node
75 Division element

What is claimed is:

1. A QAM receiver comprising:
    (a) a signal input for receiving an analog input signal;
    (b) an anti-aliasing filter and a series connected analog/digital converter for converting the received analog input signal into a digital signal;
    (c) a carrier frequency loop for detecting a carrier frequency of the received analog input signal;
    (d) a clock phase loop for detecting a clock phase of the received analog input signal; and
    (e) a control circuit which is switchable between a receive mode of operation and a test mode of operation, wherein, in the test mode of operation, the control circuit applies a center frequency adjusting signal to the carrier frequency loop for adjustment of a center frequency and applies a frequency band adjusting signal to the clock phase loop for adjustment of a frequency bandwidth to measure power level values for the entire frequency band of the received analog input signal;
    (f) wherein, in the test mode, a signal output by a signal generator is supplied to the signal input, and an evaluating circuit compares the output signal of the signal generator with an output signal calculated from the measured power level values to determine whether the anti-aliasing filter and the series connected analog/digital converter are operating faultlessly.

2. The QAM receiver as claimed in claim 1, wherein, in the test mode, when it is determined that the anti-aliasing filter and the series connected analog/converter are not operating faultlessly, it is further detected whether maladjustment of the anti-aliasing filter exists by bypassing the anti-aliasing filter by means of a multiplexer and applying a signal output by the signal generator directly to the analog/digital converter, wherein the evaluating circuit compares the output signal of the signal generator with an output signal calculated from the measured power level values to determine whether the analog/digital converter is operating faultlessly.

3. The QAM receiver as claimed in claim 1, wherein a mixing stage is provided which multiplies a digital in-phase signal and a digital quadrature phase signal by a control signal of the carrier frequency loop and delivers the result to subsequent resampling filters.

4. The QAM receiver as claimed in claim 3, wherein the resampling filters resample the digital in-phase signal and the digital quadrature phase signal in dependence on a control signal of the clock phase loop.

5. The QAM receiver as claimed in claim 4, wherein an automatic gain control follows the resampling filters.

6. The QAM receiver as claimed in claim 3, wherein a first matched filter for the digital in-phase signal and a second matched filter for the digital quadrature phase signal are provided.

7. The QAM receiver as claimed in claim 6, wherein the carrier frequency loop exhibits a carrier frequency detector which generates a carrier frequency error detection signal in dependence on the filtered output signals of the matched filters, a subsequent digital loop filter and a numerically controlled oscillator for generating the control signal for the mixing stage.

8. The QAM receiver as claimed in claim 6, wherein the clock phase loop exhibits a clock phase detector which generates a clock phase error detection signal in dependence on the filtered output signals of the two matched filters, a subsequent digital loop filter and a numerically controlled oscillator for generating a control signal for adjusting the resampling filters.

9. The QAM receiver as claimed in claim 7 or claim 8, wherein a multiplexer is in each case provided between the digital loop filter and the numerically controlled oscillator in the carrier frequency loop and in the clock phase loop.

10. The QAM receiver as claimed in claim 9, wherein the multiplexers in each case exhibit a first input for the signal filtered by the digital loop filter, a second input for an adjusting signal, and output for connection to the numerically controlled oscillator and a control input for switching between the two inputs.

11. The QAM receiver as claimed in claim 10, wherein the control circuit is provided which switches the first input of the two multiplexers through to the numerically controlled oscillator in a normal receive mode of operation and switches the second input of the two multiplexers through to the numerically controlled oscillator in a measuring mode of operation.

12. The QAM receiver as claimed in claim 11, wherein, in the test mode of operation, the control circuit applies a center frequency adjusting signal to the second input of the multiplexer of the carrier frequency loop and the frequency bandwidth adjusting signal to the second input of the multiplexer of the clock phase loop.

13. The QAM receiver as claimed in claim 1, wherein the control circuit drives an automatic gain control via a control line for reading out the power level values.

14. The QAM receiver as claimed in claim 1, wherein the control circuit receives an external control signal for switching between the receive mode of operation and the test node of operation via an external control line.

15. The QAM receiver as claimed in claim 1, wherein the anti-aliasing filter is followed by a multiplexer which is switched by the control circuit via a control line.

16. The QAM receiver as claimed in claim 15, wherein the multiplexer exhibits a first input which is connected to the output of the anti-aliasing filter, a second input which is connected to the input of the anti-aliasing filter and an output which is connected to the analog/digital converter.

* * * * *